US006436560B1

(12) United States Patent
Kato et al.

(10) Patent No.: US 6,436,560 B1
(45) Date of Patent: Aug. 20, 2002

(54) MAGNETIC HEAD AND MAGNETIC DISK DEVICE USING THE SAME

(75) Inventors: Atsushi Kato, Odawara; Koji Kaneyama, Kyoto; Kiyonori Shiraki, Odawara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/343,724

(22) Filed: Jun. 30, 1999

(30) Foreign Application Priority Data

Jul. 3, 1998 (JP) .......................................... 10-188538

(51) Int. Cl.[7] ............................................... G11B 5/66
(52) U.S. Cl. ............... 428/692; 428/694 T; 428/694 R; 428/694 TS; 428/694 TM; 428/900; 360/113; 360/125; 360/126; 360/127; 324/252
(58) Field of Search ............................ 428/692, 694 T, 428/694 R, 694 TS, 694 TM, 900; 360/113, 126, 125, 127; 324/252

(56) References Cited

U.S. PATENT DOCUMENTS

| | | | | |
|---|---|---|---|---|
| 5,621,596 A | * | 4/1997 | Santini | 360/126 |
| 6,103,073 A | * | 8/2000 | Thayamballi | 204/192.2 |
| 6,104,576 A | * | 8/2000 | Santini | 360/126 |
| 6,130,809 A | * | 10/2000 | Santini | 360/317 |
| 6,154,345 A | * | 11/2000 | Ishiwata | 360/317 |
| 6,172,848 B1 | * | 1/2001 | Santini | 360/126 |
| 6,221,559 B1 | * | 4/2001 | Lee | 430/311 |
| 6,317,289 B1 | * | 11/2001 | Sasaki | 360/126 |
| 6,330,743 B1 | * | 12/2001 | Iijima | 29/603.14 |
| 6,339,523 B1 | * | 1/2002 | Santini | 360/317 |

FOREIGN PATENT DOCUMENTS

JP 3-156714 7/1991

OTHER PUBLICATIONS

Tsang et al, Gigabit density . . . IEEE Transactions on Magnetics, vol. 26, No. 5 pp. 1689–1697 Sep. 1990.*
IEEE Transactions on Magnetics, vol. 26, No. 5, Sep. 1990, "Gigabit Density Recording Using Dual–Element MR/Inductive Heads on Thin–Film Disks", C. Tsang et al, pp. 1689–1692.

* cited by examiner

*Primary Examiner*—Leszek Kiliman
(74) *Attorney, Agent, or Firm*—Mattingly, Stanger & Malur, P.C.

(57) ABSTRACT

A magnetic head comprises: an induction type head for recording including a lower magnetic core, a writing gap film formed on the lower magnetic core, an upper magnetic core having a track portion and a portion spreading from the track portion, a plurality of insulating films laminated between the lower magnetic core and the upper magnetic core, and a coil formed between the plurality of insulating films. One of the plurality insulating films is an insulating film determining a zero throat level position. The track portion of the upper magnetic core is an air bearing surface. A magnetoresistance effect type head for reproducing includes a lower shielding film and a magnetoresistance effect sensor film is formed between the lower shielding film and the lower magnetic core. The position where the upper magnetic core spreads is located nearer to the air bearing surface than the tip end position arranged nearest to the air bearing surface among the tip end positions of the insulating films formed on the insulating film determining the zero throat level position. This can provide a magnetic head having good magnetic characteristics and improved accuracy in the width of a track on the air bearing surface.

14 Claims, 6 Drawing Sheets

FIG. 1A

PRIOR ART

FIG. 1B

PRIOR ART

MAGNETIC HEAD AND MAGNETIC DISK DEVICE USING THE SAME

BACKGROUND OF THE INVENTION

1. Field of the Invention

The present invention relates to a magnetic head of the type having a recording head and a reproducing head separately and used for a magnetic recording/reproducing device and a magnetic disc device using the magnetic head.

2. Description of the Related Art

One of the magnetic heads of the type having a recording head and a reproducing head separately is a magnetic head using a magnetoresistance effect element (hereinafter referred to as "MR element"). The MR element uses the characteristics that resistance changes in response to a change in the intensity of magnetic field and its reproducing output does not depend on the running speed of a magnetic recording medium, but depends only on the amount of magnetic flux of a magnetic signal. Therefore, the MR element can produce a sufficient reproducing output even if the running speed is low and hence has an advantage in increasing the recording density of a magnetic recording device and in reducing the size thereof.

The magnetic head of this kind is disclosed in IEEE Transaction on Magnetics, Vol. 26, page 1689, 1990, for example.

The magnetic head has increased the number of turns of coil in order to write by an intense magnetic field and to produce a large reproducing output and an insulating film for insulating the coil has been formed in multiple layers. Japanese Unexamined Patent Publication No. Hei 3-156714 discloses a technology for covering the whole multiple insulating films by the other insulating film in order to eliminate a level difference produced by the multiple insulating films.

On the other hand, in order to improve the areal recording density of magnetic recording, it will be necessary in the future to extensively increase a track density as well as a linear recording density. This requires that the track of a magnetoresistance effect head (hereinafter referred to as "MR head") be formed in still narrower width and with higher accuracy.

The conventional magnetic head described above is not sufficient in the accuracy of a zero throat level position because it has the other insulating film covering the whole multiple insulating films for insulating the coil. In this connection, a throat level portion means a portion from the air bearing surface of a magnetic core to the tip end of interlayer insulating films for vertically separating an upper magnetic core from a lower magnetic core more than the thickness of a write gap. A zero throat level position means the tip end position of the insulating film nearest to the air bearing surface of the magnetic core among the interlayer insulating films.

On the other hand, the structure having no other insulating film covering the whole insulating films for insulating the coil has the following problem. The upper magnetic core is formed by a method comprising the steps of forming an underlying layer for plating on the insulating film for insulating the coil, forming a frame thereon by a photoresist, and electroplating the space thereof with a conductive film. However, when a frame pattern is formed, the light from a pattern exposure system is reflected by the underlying layer for plating at the level difference portion of the insulating film to produce halation. The photoresist of the unnecessary portion is exposed to the light. Therefore, for example, there exists a problem that a part of the magnetic core forming a track is not formed in a desired shape and that the accuracy of a track width is not sufficient.

Figure 1A:
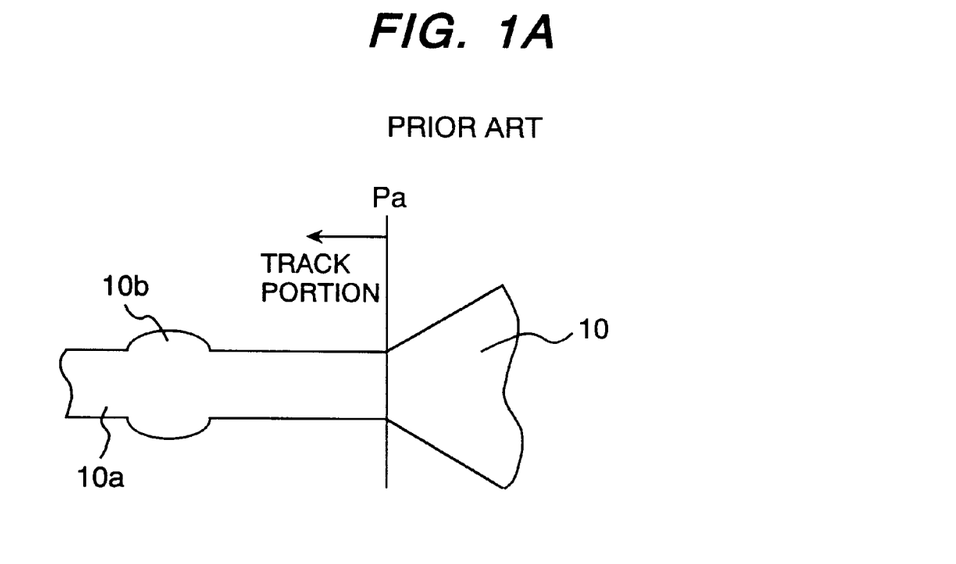
FIG. 1A is a plan view of an upper magnetic core.
Figure 1B:
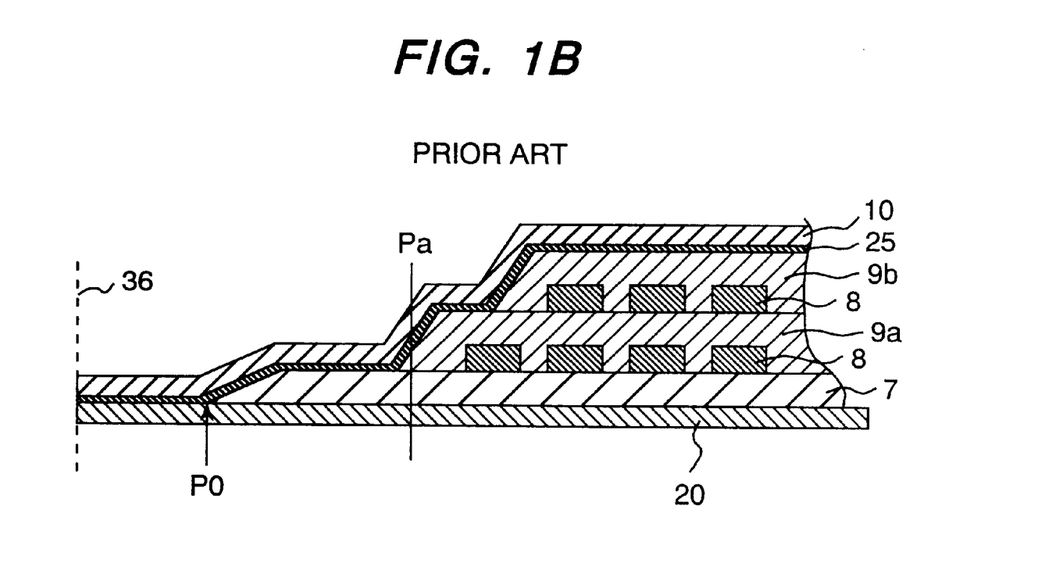
FIG. 1B is a cross sectional view showing a part of a magnetic head.

Next, the conventional magnetic head will be described with reference to drawings. FIG. 1A is a plan view of an upper magnetic core and FIG. 1B is a cross sectional view showing a part of the magnetic head. In FIG. 1B, a first layer insulating film 7 is formed on a write gap film 20 and a second layer insulating film 9a for protecting a coil 8 is formed thereon and a third layer insulating film 9b for protecting the coil 8 is formed thereon and further an upper magnetic core 10 is formed thereon via an underlying layer 25 for plating.

The upper magnetic core 10 is formed by the use of a pattern formed from a positive photoresist (not shown) on the underlying layer 25 for plating formed on the third layer insulating film 9b formed on the second layer insulating film 9a formed on the first layer insulating film 7.

As shown in FIG. 1A, if the position Pa where the upper magnetic core 10 spreads is located on the level difference portion of the second layer insulating film 9a or to the right hand side in the drawing, that is, in the direction away from the air bearing surface 36, a depression is produced in the side of the resist pattern of the track portion 10a (in FIG. 1A, a left portion from the position Pa where the upper magnetic core spreads) by the reflecting light from the underlying film 25 for plating to produce a spreading portion 10b at the track portion 10a of the upper magnetic core 10, when the photoresist is exposed to the light.

In the structure like this, since the portion where the magnetic flux of the upper track is to be contracted is expanded, the magnetic characteristics deteriorate. Further, when the air bearing surface is formed, if the track portion corresponding to the air bearing surface is expanded, there are produced variations in the width of the track of the air bearing surface 36.

SUMMARY OF THE INVENTION

It is an object of the present invention to provide a magnetic head having good magnetic characteristics and improved accuracy in the width of a track on an air bearing surface.

It is another object of the present invention to provide a magnetic disc device using the magnetic head like this.

In order to achieve the object, the magnetic head in accordance with the present invention comprises a magnetoresistance effect type head for reproducing and an induction type head for recording and has two or more interlayer insulating films vertically separating an upper magnetic core from a lower magnetic core more than the thickness of a write gap. The position where the upper magnetic core spreads from a track portion is located nearer to an air bearing surface than the tip end position nearest to the air bearing surface among the tip end positions of the insulating films which are formed on the insulating film determining the zero throat level position and have level differences to each other.

If the insulating film which is formed on the insulating film determining the zero throat level position and has a level difference is one layer, it is essential only that the position where the upper magnetic core spreads from the track portion is located in front of (to the air bearing surface side of) the tip end position, that is, the tip position of the level difference, of the insulating film. If two or more insulating films with a level difference to each other are arranged, it is required only that the position where the upper magnetic core spreads from the track portion should be located in front of the tip end position of the insulating film whose tip end position is nearest to the air bearing surface.

The position where the upper magnetic core spreads may be located on the insulating film determining the zero throat level or nearer to the air bearing surface side, that is, directly on the write gap film. However, it is desirable that it is located about 0.5 $\mu$m or more behind the air bearing surface, that is, to the zero throat level side.

Further, in order to achieve the second object of the present invention, the magnetic disc device in accordance with the present invention comprises a rotatable magnetic recording medium having an information recording layer, a drive motor for rotating the magnetic recording medium at high speeds, a control means for controlling the rotation of the drive motor, a magnetic head provided with an electromagnetic converter for writing or reading information into or from the recording layer and movable on the recording layer of the magnetic recording medium. The magnetic head is used as this magnetic head, a circuit means for controlling the information by which the magnetic head write or read the information, a positioning means for positioning the magnetic head at a predetermined position on the magnetic recording medium at high speeds, and a control circuit for controlling the positioning means.

In order to achieve the object of the present invention, the magnetic head in accordance with the present invention comprises: an induction type head for recording including a lower magnetic core, a write gap film formed on the lower magnetic core, an upper magnetic core having a track portion and a portion spreading from the track portion, a plurality of insulating films laminated between the lower magnetic core and the upper magnetic core, and a coil formed between the plurality of insulating films. One of the plurality of insulating films is an insulating film determining a zero throat level position. The track portion of the upper magnetic core is an air bearing surface.

The magnetic head further comprises a magnetoresistance effect type head for reproducing including a lower shielding film and a magnetoresistance effect sensor film formed between the lower shielding film and the lower magnetic core. The position where the upper magnetic core spreads is located nearer to the air bearing surface than the tip end position arranged nearest to the air bearing surface among the tip end positions of the insulating films formed on the insulating film determining the zero throat level position.

In the magnetic head, in the case where the plurality of insulating films comprise a first insulating film and a second insulating film and the first insulating film is the insulating film determining the zero throat level position. When the second insulating film is formed on the first insulating film, the position where the upper magnetic core spreads is located between the tip end of the second insulating film and the air bearing surface.

Further, in the magnetic head, in the case where the plurality of insulating films comprise a first insulating film, a second insulating film and a third insulating film and the first insulating film is the insulating film determining the zero throat level position and the second insulating film is formed on the first insulating film and the third layer insulating film is formed on the second layer insulating film and the tip end position of the second insulating film is located nearer to the air bearing surface than the tip end position of the third insulating film, the position where the upper magnetic core spreads is located between the tip end of the second insulating film and the air bearing surface.

Still further, in the magnetic head, in the case where the plurality of insulating films comprise a first insulating film, a second insulating film and a third insulating film and the second insulating film formed on the first insulating film is the insulating film determining the zero throat level position and the third insulating film is formed on the second insulating film, the position where the upper magnetic core spreads is located between the tip end of the third insulating film and the air bearing surface.

Furthermore, in the magnetic head, in the case where the plurality of insulating films comprise a first insulating film and a second insulating film. The second insulating film formed on the first insulating film is the insulating film determining the zero throat level position, the position where the upper magnetic core spreads is located nearer to the air bearing surface side than the zero throat level position.

In order to achieve the object of the present invention, a magnetic disc device in accordance with the present invention comprises: a rotatable magnetic recording medium having an information recording layer; a drive motor for rotating the magnetic recording medium at high speeds; and a magnetic head movable on the recording layer of the magnetic recording medium in order to write or read the information into or from the recording layer. The magnetic head comprises: an induction type head for recording including a lower magnetic core, a write gap film formed on the lower magnetic core, an upper magnetic core having a track portion and a portion spreading from the track portion, a plurality of insulating films laminated between the lower magnetic core and the upper magnetic core, and a coil formed between the plurality of insulating films. One of the plurality of insulating films being an insulating film determining the zero throat level position and the tip end of the track portion of the upper magnetic core being the air bearing surface. The magnetic device further comprises a magnetoresistance effect head for reproducing including a lower shielding film and a magnetoresistance effect sensor film formed between the lower shielding film and the lower magnetic core. The position where the upper magnetic core spreads is located nearer to the air bearing surface than the tip end position arranged nearest to the air bearing surface among the tip end positions of the insulating films formed on the insulating film determining the zero throat level position.

In the magnetic disc device, in the case where the plurality of insulating films comprise a first insulating film and a second insulating film and the first insulating film is the insulating film determining the zero throat level position and the second insulating film is formed on the first insulating film, the position where the upper magnetic core spreads is located between the tip end of the second insulating film and the air bearing surface.

Further, in the magnetic disc device, in the case where the plurality of insulating films comprise a first insulating film, a second insulating film and a third insulating film and the first insulating film is the insulating film determining the zero throat level position and the second insulating film is formed on the first insulating film and the third insulating film is formed on the second insulating film and the tip end position of the second insulating film is located nearer to the air bearing surface than the tip end position of the third insulating film, the position where the upper magnetic core spreads is located between the tip end of the second insulating film and the air bearing surface.

Still further, in the magnetic disc device, in the case where the plurality of insulating films comprise a first insulating film, a second insulating film and a third insulating film and the second insulating film formed on the first insulating film is the insulating film determining the zero throat level position and the third insulating film is formed on the second insulating film, the position where the upper magnetic core spreads is located between the tip end of the third insulating film and the air bearing surface.

Furthermore, in the magnetic disc device, in the case where the plurality of insulating films comprise a first insulating film and a second insulating film and the second insulating film formed on the first insulating film is the insulating film determining the zero throat level position, the position where the upper magnetic core spreads is located nearer to the air bearing surface side than the zero throat level position.

In order to achieve the object of the present invention, a magnetic disc device in accordance with the present invention comprises: a rotatable magnetic recording medium having an information recording layer; a drive motor for rotating the magnetic recording medium at high speeds; a control means for controlling the rotation of the drive motor; a magnetic head provided with an electromagnetic converter for writing or reading the information into or from the recording layer and movable on the recording layer of the magnetic recording medium; a circuit means for controlling the information by which the magnetic head writes or reads the information into or from the magnetic recording medium; a positioning means for positioning the magnetic head at a predetermined position on the magnetic recording medium at high speeds; and a control circuit for controlling the positioning means. The magnetic head further comprises a magnetoresistance effect type head for reproducing and an induction type head for recording, wherein the tip end of the track portion of the upper magnetic core of the induction type magnetic head constitutes the air bearing surface and interlayer insulating films vertically separating the upper magnetic core from a lower magnetic core more than the thickness of a write gap include two or more insulating films and have a coil therebetween. The position where the upper magnetic core spreads from the track portion is located nearer to the air bearing surface side than the tip end position nearest to the air bearing position among the tip end positions of the insulating films formed on the insulating film determining the zero throat level and having a level difference to each other.

Further, in the magnetic disc device, the insulating film having a level difference is one layer and the position nearest to the air bearing surface among the tip end positions of the insulating films is the tip end position of the insulating film having the level difference.

These and other objects, features and advantages of the present invention will be apparent from the following more particular description of the preferred embodiments of the present invention, as illustrated in the accompanying drawings.

DESCRIPTION OF THE PREFERRED EMBODIMENTS

Magnetic discs in accordance with the present invention and one preferred embodiment of the magnetic disc device using the magnetic disc will hereinafter be described with reference to the accompanying drawings.

Figure 2A:
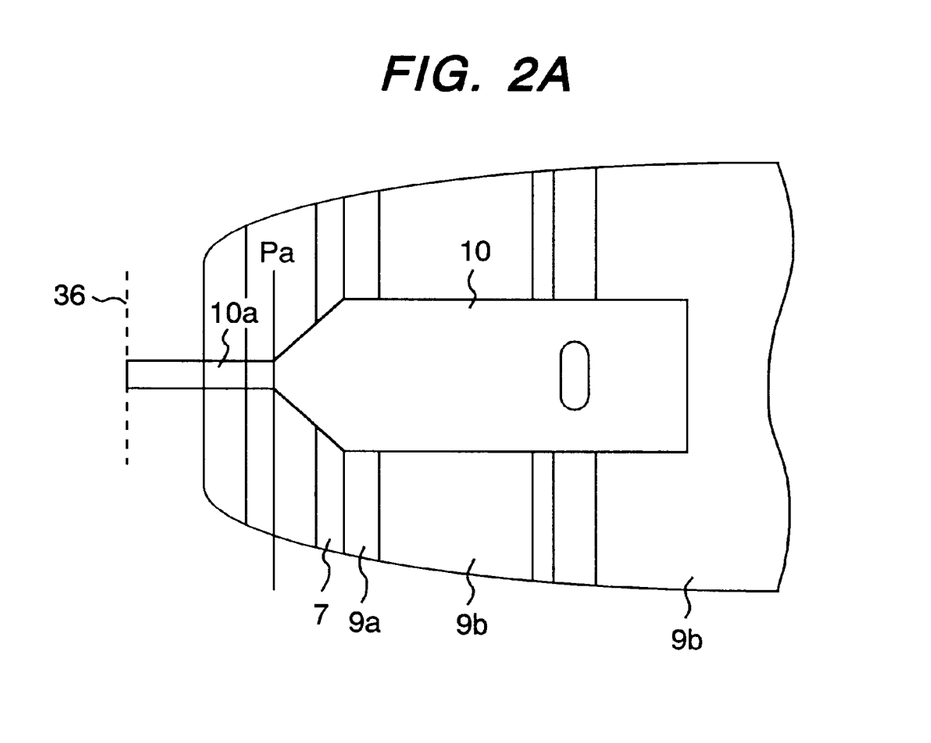
FIG. 2A is a plan view showing one preferred embodiment of the magnetic head in accordance with the present invention and FIG. 2B is a cross sectional view thereof.
Figure 2B:
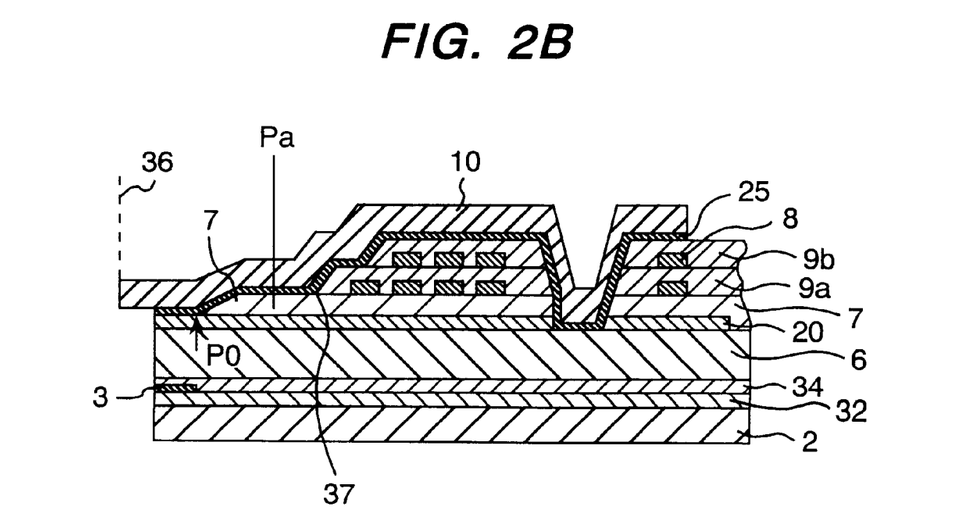

FIG. 2A is a plan view showing one preferred embodiment of the magnetic head in accordance with the present invention and FIG. 2B is a cross sectional view thereof. In the drawings, like reference numerals designate like or corresponding components in FIG. 1 and the description thereof will be omitted except for differences in constitution.

As shown in the plan view of the magnetic head shown in FIG. 2A, the magnetic head in accordance with the present invention is provided with an upper magnetic core 10 and insulating films. As is evident from FIG. 2B, the insulating films comprises a first layer insulating film 7, a second layer insulating film 9a, and a third layer insulating film 9b.

As is evident from FIG. 2B, the magnetic head comprises a lower shielding film 2, an MR lower gap film 32 made of alumina and formed on the lower shielding film 2, a magnetoresistance effect sensor film 3 formed on the MR lower gap film 32, an MR upper gap film 34 formed on the magnetoresistance effect sensor film 3 and the MR lower gap film 32, an upper shielding film-cum-lower magnetic core film 6 formed on the MR upper gap film 34, and a write gap film 20 formed on the upper shielding film-cum-lower magnetic core film 6 formed on the MR upper gap film 34. In the present preferred embodiment, a zero throat level position P0 is located at the tip end of the first layer insulating film 7.

In the present preferred embodiment, a position Pa where the upper magnetic core 10 shown in FIG. 2A spreads is located on the insulating film determining the zero throat level position P0. In this case, on the first layer insulating film 7, and nearer to an air bearing surface 36 than the tip end 37 of the second layer insulating film 9a formed thereon. Therefore, when the photoresist described above is exposed to light, the periphery of a track portion 10a is not exposed to the light reflected by an underlying layer 25 for plating and hence the track portion 10a can be formed like a nearly linear structure.

In the magnetic head of the present preferred embodiment, an induction-type head for recording comprises the upper shielding film-cum-lower magnetic core 6, the write gap film 20, the coil 8, the first layer insulating film 7, the second layer insulating film 9a, the third layer insulating film 9b, the underling layer 25 for plating, and the upper magnetic core. A magnetoresistance effect type head comprises the lower shielding film 2, the MR lower gap film 32, the MR upper gap film 34, the magnetoresistance effect sensor film 3, the upper shielding film-cum-lower magnetic core film 6.

Next, a process for manufacturing the magnetic head will be described with reference to FIG. 3.

Figure 3:
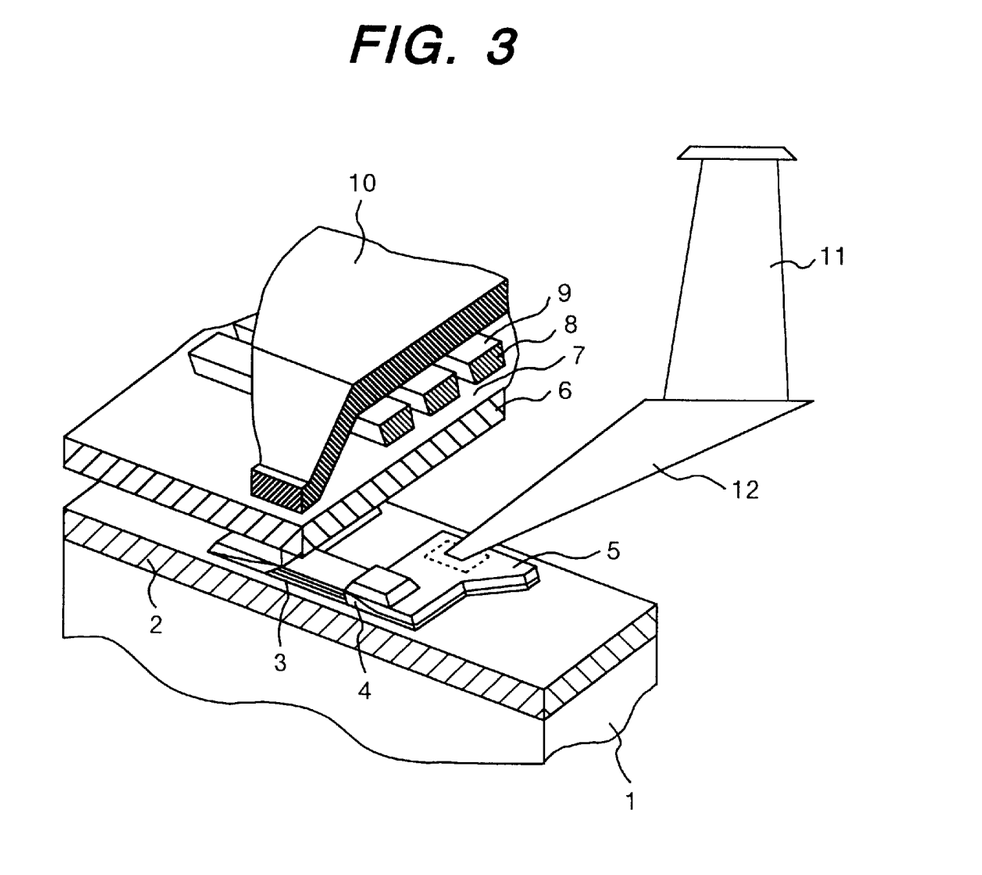
FIG. 3 is a partial cross sectional view in perspective of the magnetic head shown in FIG. 2.

FIG. 3 is a partial cross sectional view in perspective of the magnetic head shown in FIG. 2. In the drawing, the lower shielding film 2 formed of a magnetic film made of Permalloy (NiFe) or the like and the lower gap film 32 formed of insulating film made of alumina or the like (not shown in FIG. 3 to avoid making the drawing complex, see FIG. 2B) are formed on a ceramic substrate 1 and the magnetoresistance effect sensor film 3 is formed like stripes. The magnetoresistance effect sensor film 3 comprises a plurality of films such as magnetoresistance effect films using magnetic material such as Permalloy (NiFe) and bias films for biasing the magnetoresistance effect films. Further, at the side of them are formed a magnetic domain control film 4 for stabilizing the magnetic domain of the magnetoresistance effect sensor film 3 and an electrode conductive film 5 for supplying a current for making the magnetoresistance effect sensor film 3 function as a sensor. The electrode conductive film 5 is formed by a lift-off method. The upper gap film 34 (not shown, see FIG. 2B) formed of the insulating film made of alumina or the like are formed on the electrode conductive film 5. In order to put the electrode conductive film 5 into contact with a leader line 12, the desired portion of the upper gap film 34 on the electrode conductive film 5 is removed to make an aperture. The leader line 12 of the electrode conductive film 5 extends outside from the lower shielding film 2. Further, the leader line 12 is simultaneously formed of the same film as the upper shielding film-cum-lower magnetic core film 6 and is patterned in a predetermined shape. This film is formed of the magnetic film such as Permalloy or the like. Further, the write gap film 20 (not shown, see FIG. 2B) is formed thereon.

Next, as shown in FIG. 2B, the first layer insulating film 7 made of resist is formed on the write gap film 20. The coil 8 for passing a current through the induction-type head is formed on the first layer insulating film 7 by a plating method and the second layer insulating film 9a is formed thereon by the same process as used for the first layer insulating film 7. Further, the coil 8 and the third layer insulating film 9b are formed thereon. In this manner, a multiple-layer structure is formed as shown in FIG. 2B. Although this multiple-layer structure is not shown in FIG. 3, it can be understood with reference to FIG. 2B. Then, the upper magnetic core 10 is formed thereon.

The upper magnetic core 10 is formed by the use of a plating film. First, a resist frame for a magnetic plating film is formed on the underlying layer 25 for plating. At this time, by suitably shaping masks for forming the insulating films 7, 9a, 9b and the resist frame for the magnetic plating film, as shown in FIG. 2A, 2B, the position Pa where the upper magnetic core 10 spreads is located nearer to the air bearing surface 36 than the tip end of the second layer insulating film 9a on the first layer insulating film 7 determining the zero throat level.

In this respect, since the above-mentioned upper shielding film-cum-lower magnetic core film 6 is larger in area than the insulating films 7, 9a, 9b, the first layer insulating film 7, the second layer insulating film 9a and the third layer insulating film 9b can be formed in a nearly flat plane, whereby defects caused by a break in a coil can be reduced in number.

Finally, a terminal 11 for connecting a lead wire and a protective film for protecting an element are formed. This is the end of the process for manufacturing the magnetic head.

In this connection, the same elements are arranged at equal intervals on a wafer and are manufactured at the same time and then are divided into individual magnetic heads. Ten wafers were manufactured in accordance with the manufacturing process shown by the preferred embodiment described above and the size of upper track of the wafer was measured from the air bearing surface for all the elements. The variation $3\sigma$ in measurements was 0.13 to 0.19 $\mu$m.

In order to compare with the magnetic head of the present preferred embodiment, a magnetic head having a conventional structure in which the position where the upper magnetic core spreads is located at the position shown in FIG. 1A and FIG. 1B was manufactured in accordance with the manufacturing method described with reference to FIG. 3. The size of the upper track was measured from the air bearing surface for all the elements and the variation $3\sigma$ in measurements was 0.35 to 0.45 $\mu$m. In the case of this conventional structure, the variation in the size of track was large and hence this conventional structure cannot realize a head for high recording density.

Next, one preferred embodiment of a magnetic disc device using the magnetic head in accordance with the present invention will be described.

Figure 4:
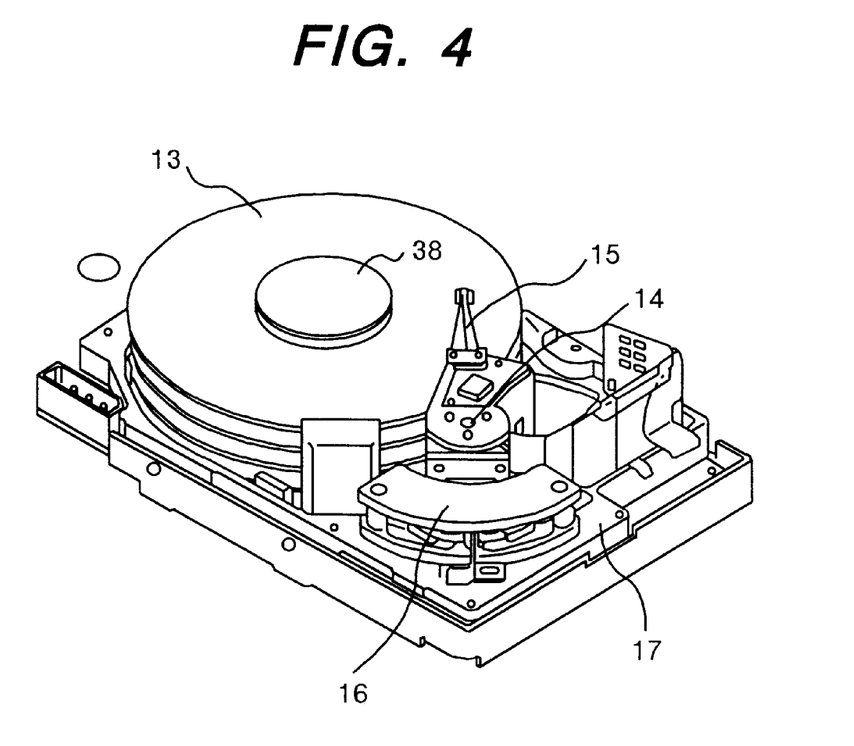
FIG. 4 is a schematic perspective view showing one preferred embodiment of the magnetic disc provided with the magnetic head in accordance with the present invention.

FIG. 4 is a schematic perspective view showing one preferred embodiment of a magnetic disc device provided with the magnetic head in accordance with the present invention. As shown in FIG. 4, the magnetic disc device comprises a plurality of magnetic discs 13 stacked at equal intervals on a spindle 38, a magnetic head 15 held by a rotary carriage assembly 14, a voice coil motor 16 for driving the carriage assembly 14, and a base 17 for supporting these members. Further, the magnetic disc device is provided with a voice coil motor control circuit for controlling the voice coil motor 16 and a control means for controlling a drive motor rotating the magnetic discs 13 (both of them are not shown in FIG. 4) according to a signal from a higher level system such as a magnetic disc control system and is connected to the higher level system via an interface unit for exchanging signals with the higher level system and a read/write circuit for controlling a current passed through the magnetic head. In this respect, the employment of the thin-film magnetic head of the preferred embodiment described above as the magnetic head 15 can improve the reliability of the magnetic disc device and the assembly yield thereof.

Next, another preferred embodiment will be described with reference to FIG. 5A and FIG. 5B.

Figure 5A:
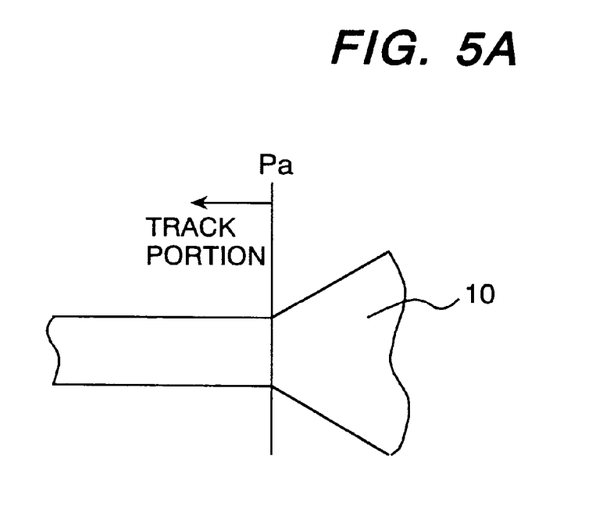
FIG. 5A is a plan view showing another preferred embodiment of the magnetic head in accordance with the present invention and FIG. 5B is a cross sectional view thereof.
Figure 5B:
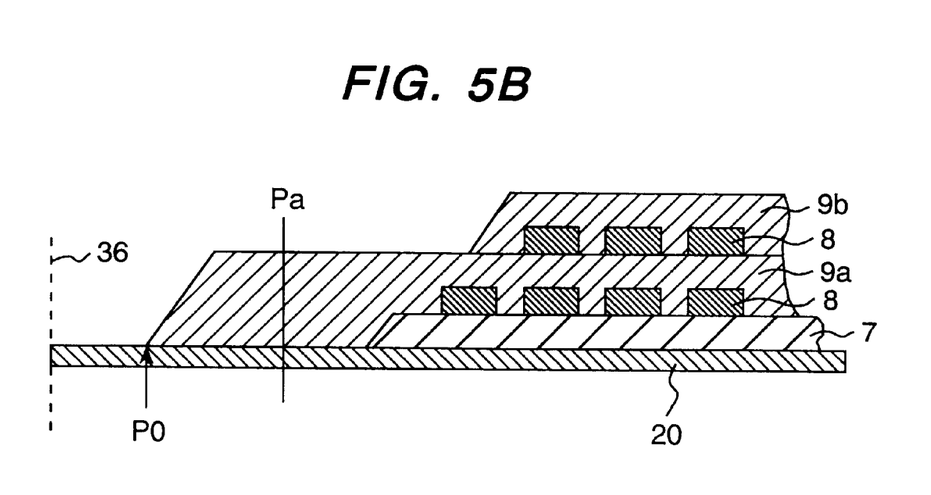

FIG. 5A is a plan view of a main part showing another preferred embodiment of the magnetic head in accordance with the present invention, and FIG. 5B is a cross sectional view of the main part. Since the part of the magnetic head not shown in FIG. 5 is the same as the magnetic head shown in FIG. 2A and FIG. 2B, the part is omitted. The magnetic head shown in FIG. 5 is different from the magnetic head shown in FIG. 2 in the insulating film determining the zero throat level position and the position Pa where the upper magnetic core 10 spreads.

Another preferred embodiment of the magnetic head in accordance with the present invention will hereinafter be described with reference to FIG. 5. In this magnetic head, the zero throat level position P0 is determined by the second layer insulating film 9a. Therefore, compared with the magnetic head of the type determining the zero throat level position P0 by the first layer insulating film 7 shown in FIG. 2, the magnetic head of this type can increase the thickness of the insulating film near the zero throat level, that is, the thickness of the second layer insulating film 9a extending in the direction of the air bearing surface 36 from the tip end of the first layer insulating film 7 and can reduce the possibility of deterioration of magnetic characteristics such as magnetic flux leak or the like and further can improve the insulating performance of the writing element.

Although the insulating film determining the zero throat level is the first layer insulating film 7 in the preferred embodiment in FIG. 2, the second layer insulating film 9a determines the zero throat level in another preferred embodiment in FIG. 5. As shown in FIG. 5A, the position Pa where the upper magnetic core 10 spreads is located on the second layer insulating film 9a and near to the air bearing surface 36 than the tip end of insulating film formed on the second layer insulating film 9a and having a level difference thereto, that is, the tip end of the third layer insulating film 9b.

Next, still another preferred embodiment in accordance with the present invention will be described with reference to FIG. 6.

Figure 6A:
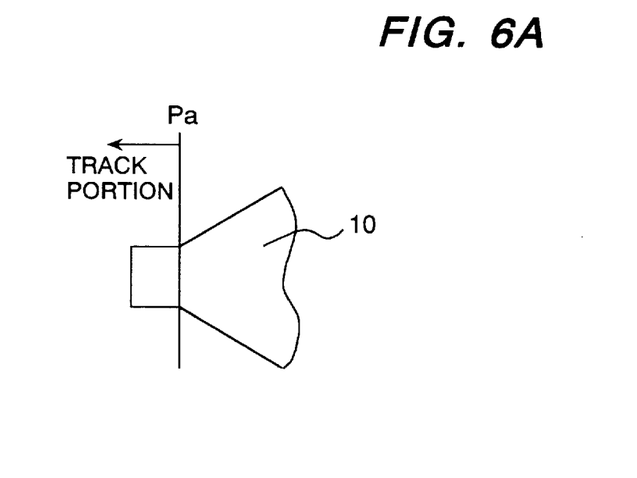
FIG. 6A is a plan view showing still another preferred embodiment of the magnetic head in accordance with the present invention and FIG. 6B is a cross sectional view thereof.
Figure 6B:
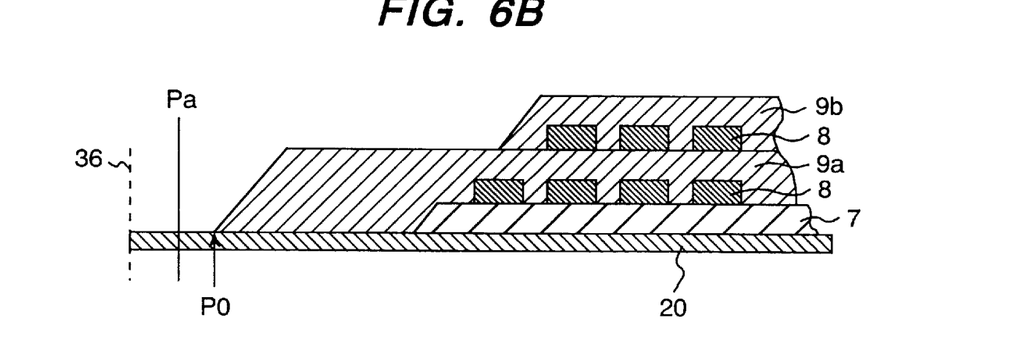

FIG. 6A is a plan view of a main part showing the still another preferred embodiment of the magnetic head in accordance with the present invention, and FIG. 6B is a cross sectional view of the main part. Since the part of the magnetic head not shown in FIG. 6 is the same as the magnetic head shown in FIG. 2A and FIG. 2B, the part is omitted. The magnetic head shown in FIG. 6 is different from the magnetic head shown in FIG. 2 in the insulating film determining the zero throat level position P0 and in the position Pa where the upper magnetic core 10 spreads.

As shown in FIG. 6, in this magnetic head, the position Pa where the upper magnetic core 10 spreads is located near to the air bearing surface 36 than the tip end of insulating film determining the zero throat level, that is, the tip end of the second layer insulating film 9a. Therefore, the position Pa where the upper magnetic core 10 spreads is located between the air bearing surface 36 and the zero throat level position P0 and the volume of the upper magnetic core 10 increases from this position. This increases magnetic characteristics, in particular, overwriting characteristics.

The magnetic heads of still another preferred embodiment shown in FIG. 6 and the magnetic heads of FIG. 5 having the structure in which the position Pa where the upper magnetic core 10 spreads is located in the back (in the right hand side in the drawing) of the tip end of the insulating film determining the zero throat level, that is, on the second layer insulating film 9a were manufactured. Then the magnetic characteristics were measured for the magnetic heads. The test results showed that the magnetic heads of still another preferred embodiment shown in FIG. 6 improved the overwriting characteristics by 30 to 40% on average.

In the present invention, the zero throat level position P0 designates the tip end of the insulating film extending nearest to the air bearing surface 36 of the upper magnetic core 10 among the plurality of insulating films. That is, the zero throat level position P0 designates the tip end of the first layer insulating film 7 in the preferred embodiment in FIG. 2B, and the tip end of the second layer insulating film 9a in the preferred embodiment in FIG. 5B and FIG. 6B.

As described above, according to the present invention, the magnetic characteristics and the accuracy of the width of the track of the air bearing surface can be improved by determining the position where the upper magnetic core of the magnetic head spreads.

Further, since the magnetic head according to the present invention has high accuracy in the width of the track, it can realize the magnetic disc device with high recording density.

The present invention may be embodied in other specific forms without departing from the spirit or essential characteristics thereof. The present embodiment is therefore to be considered in all respects as illustrative and not as restrictive, the scope of the present invention being indicated by the appended claims rather than by the foregoing description and all changes which come within the meaning and range of equivalency of the claims are therefore intended to be embraced therein.

What is claimed is:

1. A magnetic head comprising:
    an inductive head for recording including a lower magnetic core, a write gap film formed on the lower magnetic core an upper magnetic core having a track portion and a portion spreading from the track portion, a plurality of insulating films laminated between the lower magnetic core and the upper magnetic core, and a coil formed between the plurality of insulating films, one of the plurality of insulating films determining a zero throat level position and the track portion of the upper magnetic core being an air bearing surface; and
    a magnetoresistance effect head for reproducing including a lower shielding film and a magnetoresistance effect sensor film formed between the lower shielding film and the lower magnetic core, wherein the position where the upper magnetic core spreads is located nearer to the air bearing surface than the tip end position arranged nearest to the air bearing surface among the tip end positions of the insulating films formed on the insulating film determining the zero throat level position.

2. A magnetic head according to claim 1, wherein in a case where the plurality of insulating films comprise a first insulating film and a second insulating film and the first insulating film determines the zero throat level position and the second insulating film is formed on the first insulating film, a position where the upper magnetic core spreads is located between the tip end of the second insulating film and the air bearing surface.

3. A magnetic head according to claim 1, wherein in a case where the plurality of insulating films comprise a first insulating film, a second insulating film and a third insulating film and the first insulating film determines the zero throat level position and the second insulating film is formed on the first insulating film and the third layer insulating film is formed on the second layer insulating film and the tip end position of the second insulating film is located nearer to the air bearing surface than the tip end position of the third insulating film, a position where the upper magnetic core spreads is located between the tip end of the second insulating film and the air bearing surface.

4. A magnetic head according to claim 1, wherein in a case where the plurality of insulating films comprise a first insulating film, a second insulating film and a third insulating film and the second insulating film formed on the first insulating film determines the zero throat level position and the third insulating film is formed on the second insulating film, a position where the upper magnetic core spreads is located between the tip end of the third insulating film and the air bearing surface.

5. A magnetic head according to claim 1, wherein in a case where the plurality of insulating films comprise a first insulating film and a second insulating film and the second insulating film formed on the first insulating film determines the zero throat level position, a position where the upper magnetic core spreads is located nearer to the air bearing surface side than the zero throat level position.

6. A magnetic head comprising a magnetoresistance effect head for reproducing and an inductive magnetic head for recording, wherein the tip end of the track portion of the upper magnetic core of the inductive magnetic head constitutes an air bearing surface and interlayer insulating films vertically separating the upper magnetic core from the lower magnetic core more than a thickness of a write gap include two or more insulating films and the insulating films have a coil therebetween, and wherein a position where the upper magnetic core spreads from the track portion is located nearer to the air bearing surface than the tip end position nearest to the air bearing surface among the tip end positions of the insulating films arranged on the insulating film determining the zero throat level and having a level difference to each other.

7. A magnetic head according to claim 6, wherein the insulating film having a level difference is one layer and the position nearest to the air bearing surface among the tip end positions of the insulating films is the tip end position of the insulating film having a level difference.

8. A magnetic disc device comprising:
   a rotatable magnetic recording medium having an information recording layer;
   a drive motor for rotating the magnetic recording medium at high speeds; and
   a magnetic head movable on the recording layer of the magnetic recording medium in order to write or reach the information into or from the recording layer;
   wherein the magnetic head comprises: an inductive head for recording including a lower magnetic core, a write gap film formed on the lower magnetic core, an upper magnetic core having a track portion and a portion spreading from the track portion, a plurality of insulating films laminated between the lower magnetic core and the upper magnetic core, and a coil formed between the plurality of insulating films, one of the plurality of insulating films determining the zero throat level position and the tip end of the track portion of the upper magnetic core being the air bearing surface; and a magnetoresistance effect head for reproducing including a lower shielding film and a magnetoresistance effect sensor film formed between the lower shielding film and the lower magnetic core, and
   wherein a position where the upper magnetic core spreads is located nearer to the air bearing surface than the tip end position arranged nearest to the air bearing surface than the tip end position arranged nearest to the air bearing surface among the tip end positions of the insulating films formed on the insulating film determining the zero throat level position.

9. A magnetic disc device according to claim 8, wherein in a case where the plurality of insulating films comprise a first insulating film and a second insulating film and the first insulating film determines the zero throat level position and the second insulating film is formed on the first insulating film, a position where the upper magnetic core spreads is located between the tip end of the second insulating film and the air bearing surface.

10. A magnetic disc device according to claim 8, wherein in a case where the plurality of insulating films comprise a first insulating film, a second insulating film and a third insulating film and the first insulating film determines the zero throat level position and the second insulating film is formed on the first insulating film and the third insulating film is formed on the second insulating film and the tip end position of the second insulating film is located nearer to the air bearing surface than the tip end position of the third insulating film, a position where the upper magnetic core spreads is located between the tip end of the second insulating film and the air bearing surface.

11. A magnetic disc device according to claim 8, wherein in a case where the plurality of insulating films comprise a first insulating film, a second insulating film and a third insulating film and the second insulating film formed on the first insulating film determines the zero throat level position and the third insulating film is formed on the second insulating film, a position where the upper magnetic core spreads is located between the tip end of the third insulating film and the air bearing surface.

12. A magnetic disc device according to claim 8, wherein in a case where the plurality of insulating films comprise a first insulating film and a second insulating film and the second insulating film formed on the first insulating film determines the zero throat level position, a position where the upper magnetic core spreads is located nearer to the air bearing surface side than the zero throat level position.

13. A magnetic disc device comprising:
   a rotatable magnetic recording medium having an information recording layer;
   a drive motor for rotating the magnetic recording medium at high speeds;
   a control means for controlling the rotation of the drive motor;
   a magnetic head provided with an electromagnetic converter for writing or reading the information into or from the recording layer and movable on the recording layer of the magnetic recording medium;
   a circuit means for controlling the information by which the magnetic head writes or reads the information into or from the magnetic recording medium;
   a positioning means for positioning the magnetic head at a predetermined position on the magnetic recording medium at high speeds; and
   a control circuit for controlling the positioning means, wherein the magnetic head comprising a magnetoresistance effect head for reproducing and an inductive head for recording and the tip end of the track portion of the upper magnetic core of the inductive magnetic head constitutes the air bearing surface, and interlayer insulating films vertically separating the upper magnetic core from a lower magnetic core more than a thickness of a write gap include two or more insulating films and have a coil therebetween, and wherein a position where the upper magnetic core spreads from the track portion is located nearer to the air bearing surface side than the tip end position nearest to the air bearing position among the tip end positions of the insulating films formed on the insulating film determining the zero throat level and having a level difference to each other.

14. A magnetic disc device according to claim 13, wherein the insulating film having a level difference is one layer and the position nearest to the air bearing surface among the tip end positions of the insulating films is the tip end position of the insulating film having the level difference.

* * * * *